(12) United States Patent
Taniguchi et al.

(10) Patent No.: US 9,166,504 B2
(45) Date of Patent: Oct. 20, 2015

(54) CONTROL APPARATUS FOR MOTOR-GENERATOR

(71) Applicant: DENSO CORPORATION, Kariya, Aichi-pref. (JP)

(72) Inventors: Makoto Taniguchi, Obu (JP); Kouichi Nagata, Kariya (JP); Masahiko Osada, Okazaki (JP)

(73) Assignee: DENSO CORPORATION, Kariya (JP)

( * ) Notice: Subject to any disclaimer, the term of this patent is extended or adjusted under 35 U.S.C. 154(b) by 6 days.

(21) Appl. No.: 13/644,739

(22) Filed: Oct. 4, 2012

(65) Prior Publication Data

US 2013/0099493 A1 Apr. 25, 2013

(30) Foreign Application Priority Data

Oct. 25, 2011 (JP) ................................ 2011-234304

(51) Int. Cl.
| | |
|---|---|
| *H02P 9/14* | (2006.01) |
| *H02P 6/08* | (2006.01) |
| *H02P 27/08* | (2006.01) |
| *H02P 9/30* | (2006.01) |

(52) U.S. Cl.
CPC ............... *H02P 6/085* (2013.01); *H02P 9/302* (2013.01); *H02P 27/08* (2013.01); *H02P 2207/05* (2013.01); *H02P 2209/01* (2013.01)

(58) Field of Classification Search
CPC ............................. H02P 9/48; H02P 2009/002
USPC ....................................................... 322/59, 23
See application file for complete search history.

(56) References Cited

U.S. PATENT DOCUMENTS

| | | | |
|---|---|---|---|
| 6,400,107 B1* | 6/2002 | Nakatani et al. | 318/400.21 |
| 2006/0192534 A1* | 8/2006 | Yamauchi et al. | 322/25 |
| 2008/0278102 A1* | 11/2008 | Taniguchi | 318/400.27 |
| 2011/0031922 A1 | 2/2011 | Sakai et al. | |

FOREIGN PATENT DOCUMENTS

| | | |
|---|---|---|
| EP | 1 168 593 | 1/2002 |
| JP | 2002-291256 | 10/2002 |

(Continued)

OTHER PUBLICATIONS

Office Action (11 pages) dated Sep. 22, 2014, issued in corresponding Chinese Application No. 201210413324.9 and English translation (14 pages).

(Continued)

*Primary Examiner* — Tulsidas C Patel
*Assistant Examiner* — Sean Gugger
(74) *Attorney, Agent, or Firm* — Nixon & Vanderhye PC

(57) ABSTRACT

A control apparatus for a motor-generator includes a stator including multi-phase coils, a rotor, a multi-phase inverter one arm of which includes a switch element and a freewheeling element, and a power supply connected between a neutral point of the coils and a negative electrode of the inverter. When the switch elements are driven by rectangular wave, the low-side switch element connected to the high-side switch element is subject to PWM switching control while the high-side switch element is off. When a time point, at which the high-side switch element is turned off, is defined as a base point, if α is defined as a time when switching of the low-side switch element starts, and β is defined as a time when the switching ends, β-α is 120 degrees in electrical degree or more, α is more than 0 degrees, and β is less than 180 degrees.

16 Claims, 6 Drawing Sheets

(56) References Cited

FOREIGN PATENT DOCUMENTS

| JP | 2003-219677 | 7/2003 |
|---|---|---|
| JP | 2003-289687 | 10/2003 |
| JP | 2008-306914 | 12/2008 |
| JP | 2011-41336 | 2/2011 |

OTHER PUBLICATIONS

Office Action (3 pgs.) dated Jun. 23, 2015 issued in corresponding Japanese Application No. 2011-234304 with an at least partial English-language translation (5 pgs.).

* cited by examiner

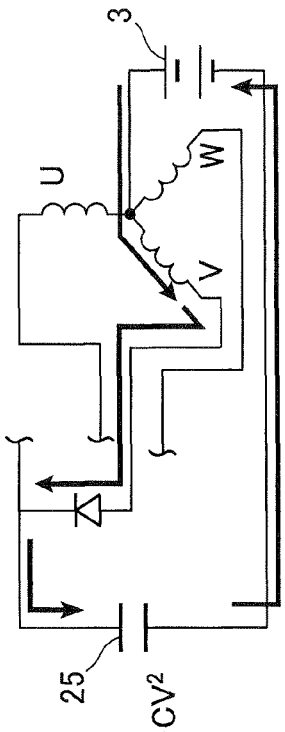

FIG.3A

OPERATION: SHORT-CIRCUIT CURRENT FLOWS INTO W PHASE MAGNETIC ENERGY IS STORED $\frac{1}{2}Li^2$

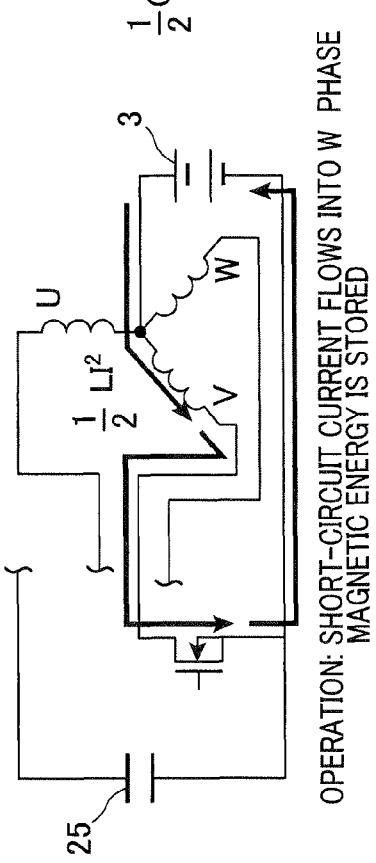

FIG.3B

OPERATION: MAGNETIC ENERGY IS DISCHARGED CAPACITOR IS CHARGED (MAGNETIC ENERGY ⇒ ELECTROSTATIC ENERGY)

$\frac{1}{2}CV^2$

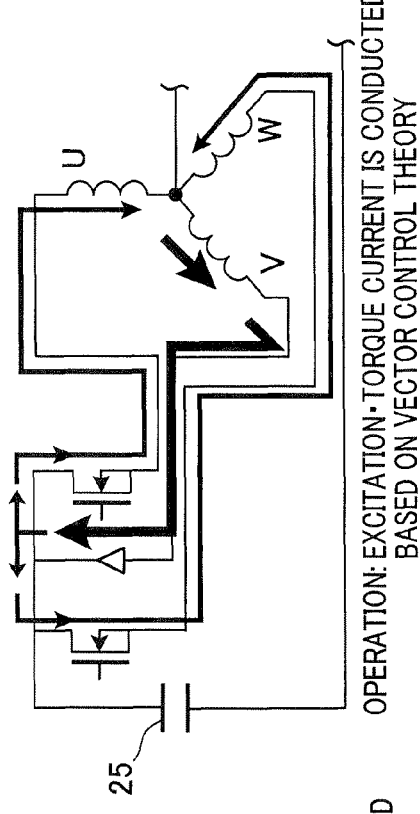

FIG.3C

OPERATION: EXCITATION·TORQUE CURRENT IS CONDUCTED BASED ON VECTOR CONTROL THEORY

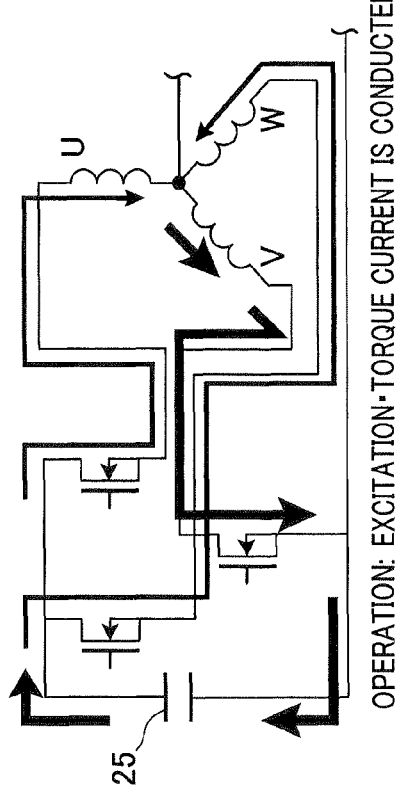

FIG.3D

OPERATION: EXCITATION·TORQUE CURRENT IS CONDUCTED BASED ON VECTOR CONTROL THEORY

CONTROL APPARATUS FOR MOTOR-GENERATOR

CROSS-REFERENCE TO RELATED APPLICATION

This application is based on and claims the benefit of priority from earlier Japanese Patent Application No. 2011-234304 filed Oct. 25, 2011, the description of which is incorporated herein by reference.

BACKGROUND

1. Technical Field

The present invention relates to a control apparatus for a motor-generator, the apparatus being used by changing the operation mode thereof between an electric power generation mode as a generator and a mechanical power generation mode as a motor.

2. Related Art

As a simple speed-increasing method for a brushless motor, a driving method using a circuit disclosed in, for example, JP-A-2008-306914 is known. This example requires a sinusoidal PWM controlled inverter to obtain stable rotational speed extensively. Hence, an expensive magnetic pole position sensor is required. In addition, since all elements are required to be subject to switching, switching losses increase, thereby lowering the system efficiency, a large cooling unit is required for the inverter, and protection against switching noise is required. Accordingly, although the driving method can be used for an expensive apparatus, the driving method is not suited to be used for, in particular, electric components for a light automobile and a motorcycle from a cost viewpoint.

SUMMARY

An embodiment provides a control apparatus for a motor-generator. In the apparatus, a simplified magnetic pole position sensor is provided. Even if the number of times of switching is decreased, an excellent rotating speed characteristic can be obtained. Hence, cooling and protection against noise can also be simplified.

As an aspect of the embodiment, a control apparatus for a motor-generator is provided, the apparatus including: a stator which includes multi-phase coils connected so as to form a star shape; a rotor which is coaxial with the stator and is arranged in the radial direction via a predetermined gap; a multi-phase inverter one arm of which includes a switch element and a free wheeling element; and a DC power supply which is connected between a neutral point of the multi-phase coils and a DC negative electrode of the multi-phase inverter. When the switch elements of the inverter are driven by a rectangular wave pattern signal, the switch element of a low side connected to the switch element of a high side in series is subject to PWM switching control while the switch element of the high side is in an off-state. When a time point, at which the switch element of the high side is turned off, is defined as a base point, if $\alpha$ is defined as a time when switching of the switch element of the low side starts, and $\beta$ is defined as a time when the switching ends, $\beta-\alpha$ is 120 degrees in electrical degree or more, $\alpha$ is more than 0 degrees, and $\beta$ is less than 180 degrees.

BRIEF DESCRIPTION OF THE DRAWINGS

In the accompanying drawings:

FIGS. 3A to 3D are diagrams for explaining operations of the first embodiment;

DETAILED DESCRIPTION OF THE PREFERRED EMBODIMENTS

With reference to the accompanying drawings, hereinafter will be described an embodiment of the present invention.

(First embodiment)

Figure 1:
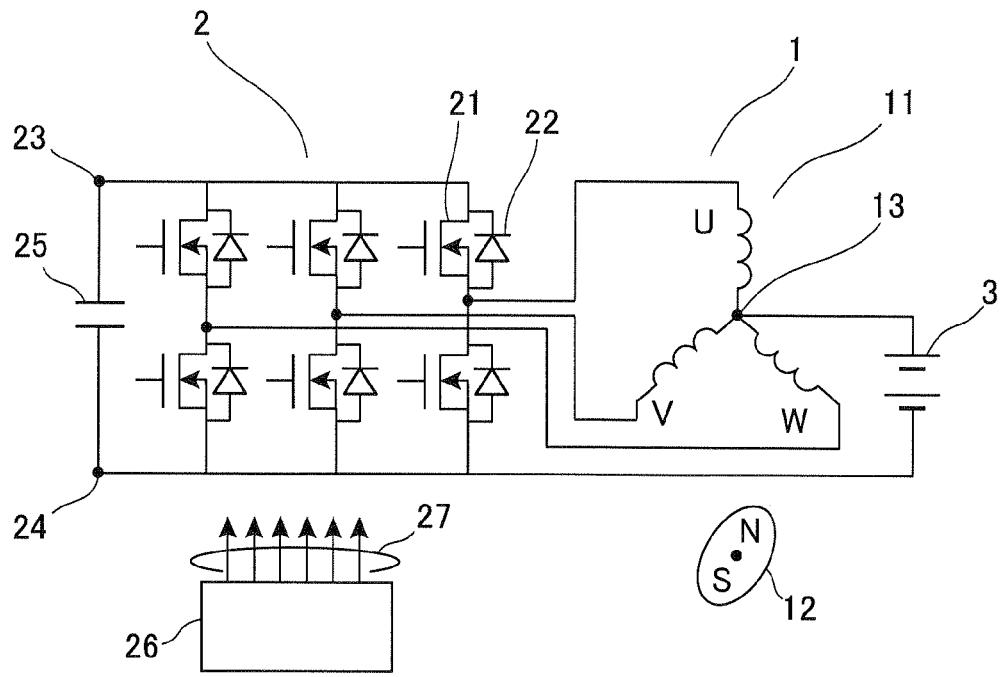
FIG. 1 is a diagram showing a configuration of a first embodiment.

FIG. 1 shows a configuration of the first embodiment. A motor-generator 1 includes a stator 11 and a rotor 12. The rotor 12 may be a permanent magnet type, a wound-field type, or a cage-type inductor. The rotor 12 may have a magnetic salient-pole type reluctance structure which has no coil and no magnet.

The stator 11 is provided with three-phase coils which are connected so as to form a star shape. Ends of the three-phase coils are connected at a neutral point 13. The other ends of the three-phase coils are connected to an inverter 2.

In the inverter 2, a switch element 21 and a free wheeling element 22 form one arm. The same two arm formations are connected in series. Three of the serial connections are arranged in parallel.

If the switch element 21 and the free wheeling element 22 are configured by a MOSFET (metal-oxide semiconductor field-effect transistor) and a parasitic diode parasitizing to the MOSFET, mass-produced general-purpose devices can be used. However, the switch element 21 and the free wheeling element 22 are not limited to this configuration. If the switch element 21 is configured by an IGBT (insulated gate bipolar transistor) or a bipolar transistor, and a flywheel diode is used as the free wheeling element 22, the same function can be obtained.

Three switch elements 21 of the high side are connected to a DC positive electrode terminal 23. Three switch elements 21 of the low side are connected to a DC negative electrode terminal 24. A capacitor 25 is connected between the positive terminal and the negative terminal of the inverter 2. The capacitor 25 may be an electrolytic capacitor, a film capacitor, or an electric double layer capacitor.

The switch elements 21 are driven by a controller 26 which generates continuity pattern signals 27 and transmits the signals 27 to the switch elements 21 via transmission lines (not shown).

The positive electrode of a DC power supply 3 is connected to the neutral point 13 of the star-shaped connection. The negative electrode of the DC power supply 3 is connected to the DC negative electrode terminal 24 of the inverter 2. As the DC power supply 3, any type of secondary battery such as a lead acid battery, a lithium-ion battery, and a nickel hydride battery can be used.

Figure 2:
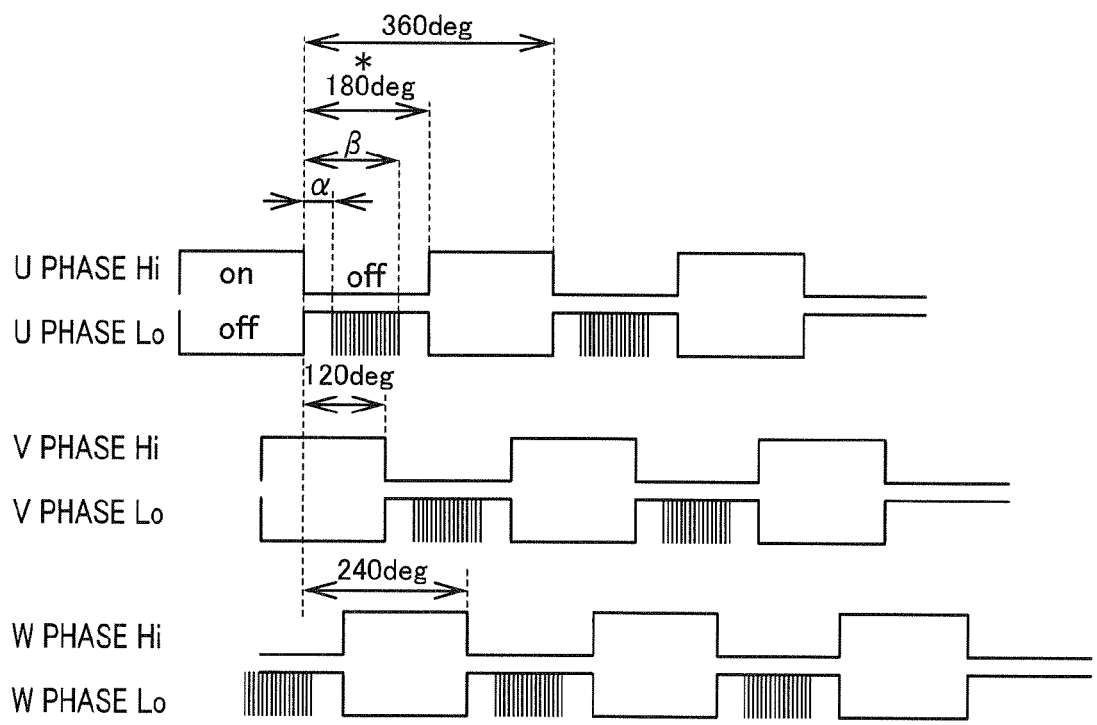
FIG. 2 is a diagram of a pattern of control of switch elements according to the first embodiment.
Figure 4:
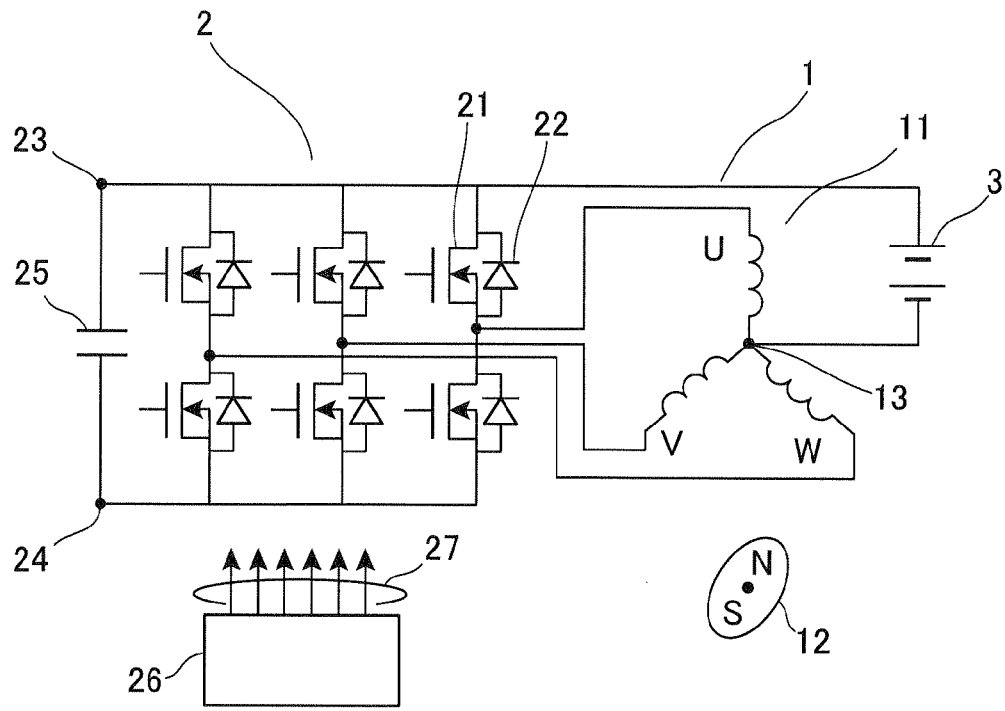
FIG. 4 is a diagram showing a configuration of a second embodiment.

Next, continuity patterns of the elements are explained with reference to FIG. 2.

The basic continuity pattern is a so-called three-phase 180-degree rectangular wave pattern in which high sides and low sides exclusively repeat ON and OFF every 180 degrees. Phases are controlled so as to be displaced 120 degrees (electrical degree) with respect to each other. In this case, low-side elements are subject to PWM switching control during the period of time during which high-side elements are in off-states, that is, the period of 180 degrees indicated with an asterisk in FIG. 2. In a state where the time point at which the high side elements are turned off is defined as a base point, if $\alpha$ is defined as the time when switching of the low-side starts, and $\beta$ is defined as the time when switching of the low-side ends, $\beta$-$\alpha$ is set to 120 degrees (electrical degree) or more. Note that $\alpha$>0 degrees and $\beta$<180 degrees are kept. For example, if $\beta$ is 150 degrees and $\alpha$ is 30 degrees, $\beta$-$\alpha$ is 120 degrees.

Next, operations performed during the period of time of switching are explained with reference to FIGS. 3A to 3D. In FIGS. 3A to 3D, elements, which are effective when the switch is in an on-state, show transistors, and elements, which are effective when the switch is in an off-state, show diodes.

Figure 6:
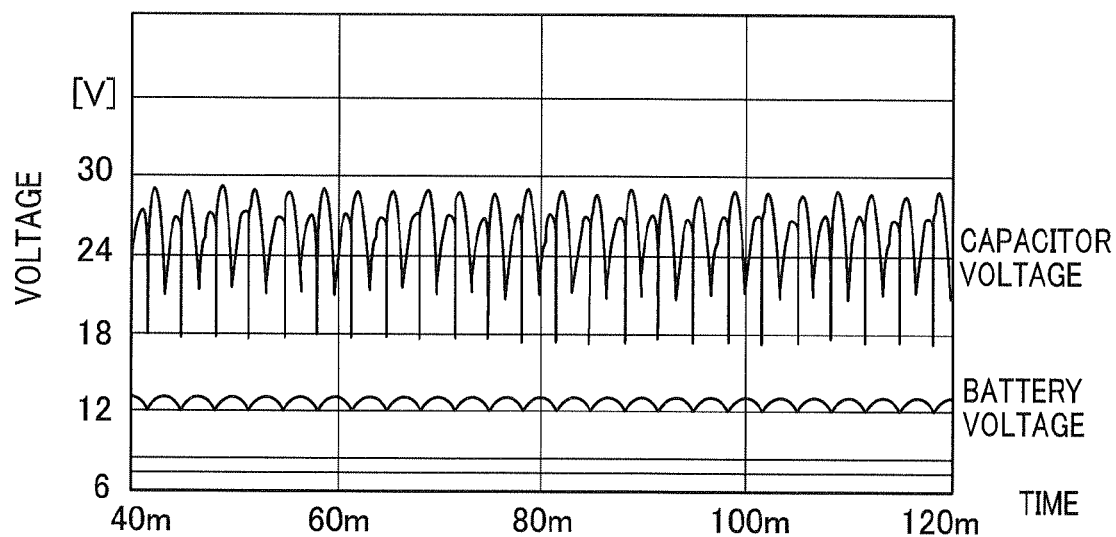
FIG. 6 is a diagram for explaining advantages of the first and second embodiments.

As shown in FIG. 3A, when the high side of the V phase is in an off-state, and the low side of the V phase is in an on-state, the DC power supply is short-circuited via the V phase coil. Hence, a high current flows through the coils, whereby magnetic energy is stored in the coil. If the low side is turned off in the next instant, the stored magnetic energy is charged into the capacitor 25 via a high-side free wheeling diode of the V phase. Due to this operation, the voltage across the capacitor 25 is increased to substantially twice the DC voltage. This operation is continued during the period of time $\beta$-$\alpha$ to charge the capacitor 25. As a result, as shown in FIG. 6, the voltage across the capacitor 25 is continuously kept at about twice the power-supply voltage.

Meanwhile, high-side transistors of the other phases are turned on. Hence, as shown in FIGS. 3C and 3D, currents are supplied from the U phase and the W phase and are subject to energy conversion into electric torque.

The whole operation is performed while changing the phase by 120 degrees depending on the position of the rotor 12, in order of V phase→W phase→U phase.

Figure 11:
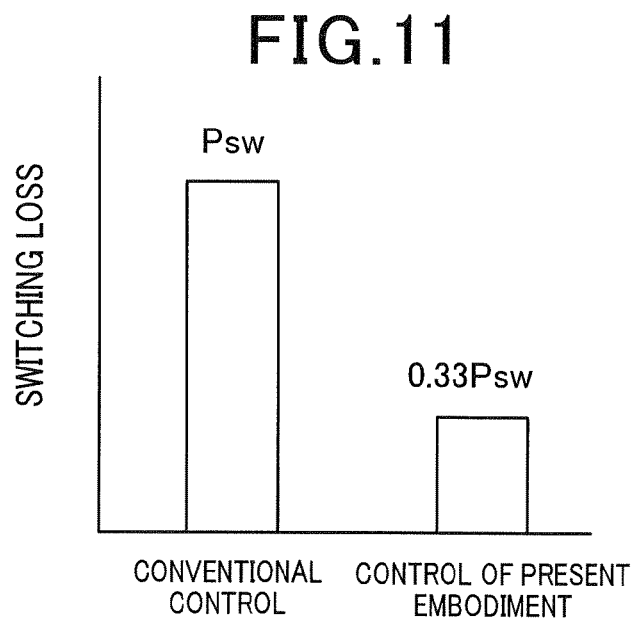
FIG. 11 is a diagram for explaining advantages of the embodiments.

The above control can realize a power-supply voltage increasing function and a torque generating function, which can eliminate a dedicated boost converter. In addition, increase in temperature and decrease in efficiency due to switching losses caused by stopping the switching of the high side, and increase in noise current can be suppressed. FIG. 11 shows a fact that the switching loss of the present embodiment is decreased with respect to that of the conventional control. The switching loss of the present embodiment is about ⅓ of that of the conventional control.

In addition, since the above control is based on a 180-degree rectangular wave conduction (signal), magnetic pole positions are not required to be precisely detected. Hence, a simple location detector or a known sensor-less control can be applied, thereby further enhancing simplification.

Note that the basic rectangular wave conduction is not limited to 180 degrees. The period of time of conduction can be arbitrarily determined in the range between 120 to 180 degrees.

(Second Embodiment)

In the second embodiment, the positive electrode of the DC power supply 3 is connected to the DC positive electrode terminal 23 of the inverter 2. The negative electrode of the DC power supply 3 is connected to the neutral point 13 of the star-shaped connection.

Figure 5:
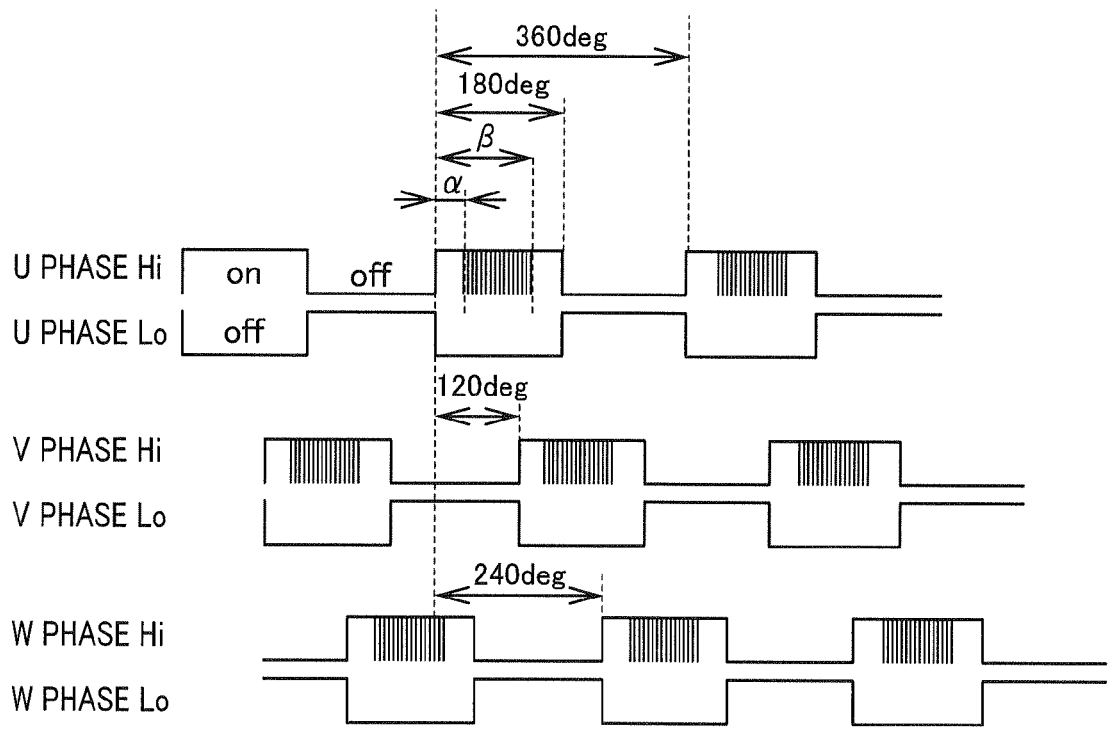
FIG. 5 is a diagram of a pattern of control of switch elements according to the second embodiment.

As shown in FIG. 5, according to the pattern of control, the high-side switch is subject to the PWM control during the period of time during which the low-side switch is in an off-state. Designating the off time point of the low-side switch as a starting point, $\alpha$ and $\beta$ are defined so as to meet "$\beta$-$\alpha$≥120 degrees", "$\alpha$>0 degrees", and "$\beta$<180 degrees".

The operation of the second embodiment is similar to the operation shown in FIGS. 3A to 3D, in which the capacitor 25 is charged via a low-side free wheeling diode.

Figure 10:
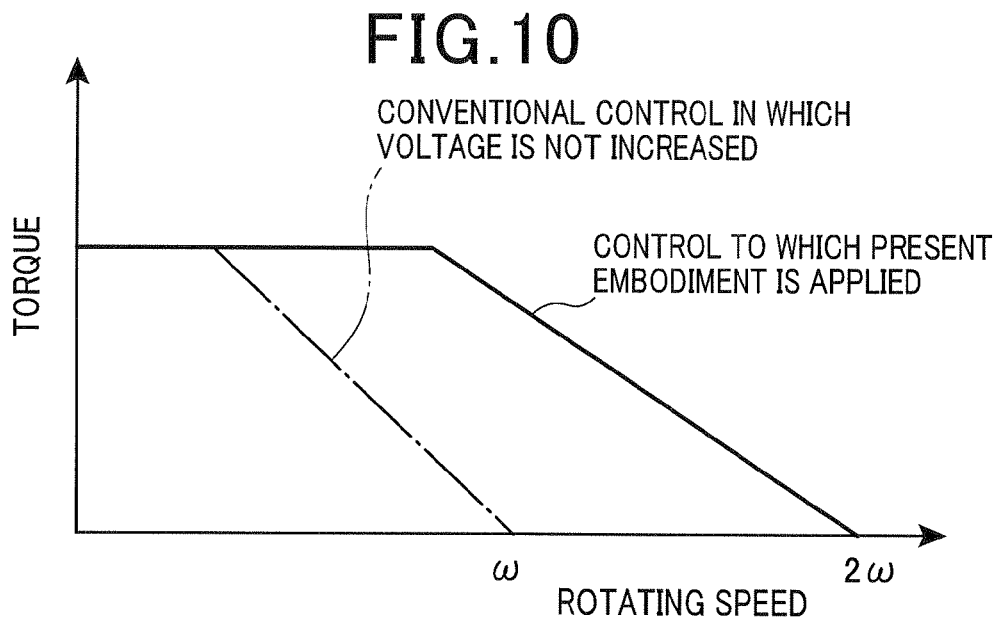
FIG. 10 is a diagram for explaining advantages of the embodiments.

As shown in FIG. 10, the control of the above embodiment can increase the driving rotating speed to about twice that of the conventional control which does not increase voltage, even though a dedicated inverter is not required.

(Modifications)

It will be appreciated that the present invention is not limited to the configurations described above, but any and all modifications, variations or equivalents, which may occur to those who are skilled in the art, should be considered to fall within the scope of the present invention.

Figure 7:
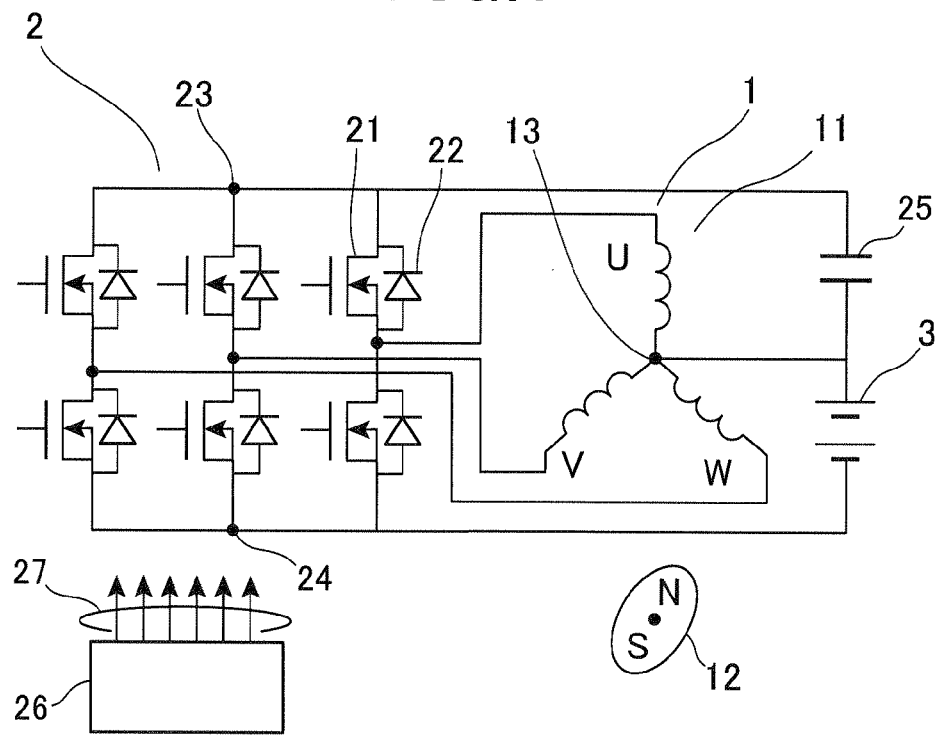
FIG. 7 is a diagram showing a configuration of a modification of the first embodiment.

In FIG. 7, the capacitor 25 is connected between the neutral point 13 and the DC positive electrode terminal 23 of the inverter 2. According to this configuration, the variation width of voltage across the capacitor 25 becomes smaller, which can decrease capacitance of the capacitor 25. In this case, the pattern of control shown in FIG. 2 is applied.

Figure 8:
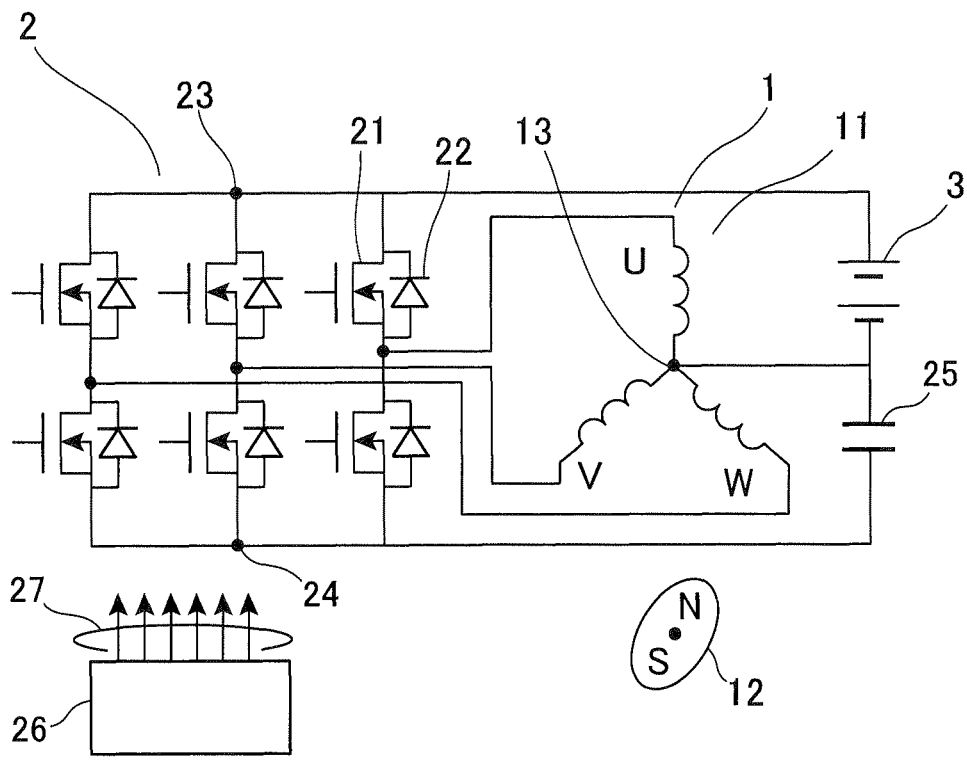
FIG. 8 is a diagram showing a configuration of a modification of the second embodiment.

As shown in FIG. 8, even when the DC power supply 3 and the capacitor 25 are interchanged, the same advantages as those described above can be obtained. In this case, the pattern of control shown in FIG. 5 is applied.

Figure 9:
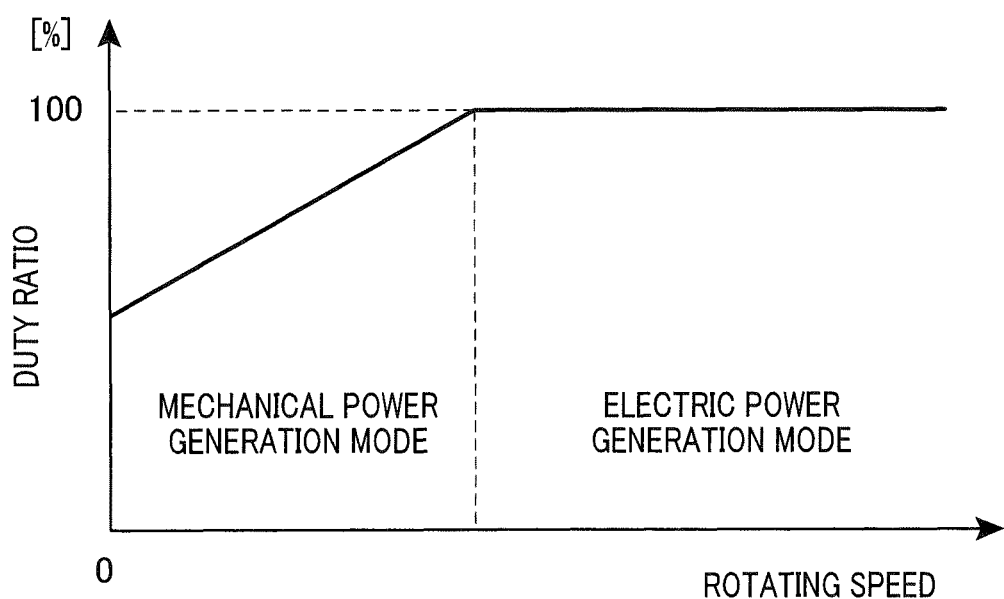
FIG. 9 is a diagram showing another embodiment.

In addition, as shown in FIG. 9, the on-duty ratio of PWM may be increased together with the rotating speed. If the operation is shifted to an electric power generation mode, when the rotating speed is a predetermined rotating speed or more, in which the duty ratio becomes 100%, the shock can be reduced which is caused when the operation is changed from a mechanical power generation mode to an electric power generation mode. Note that the duty ratio when the rotating speed is 0 can be arbitrarily set. The rate of increase of the duty ratio, which increases as the rotating speed increases, is also not required to be constant, and may be set as needed.

Figure 12:
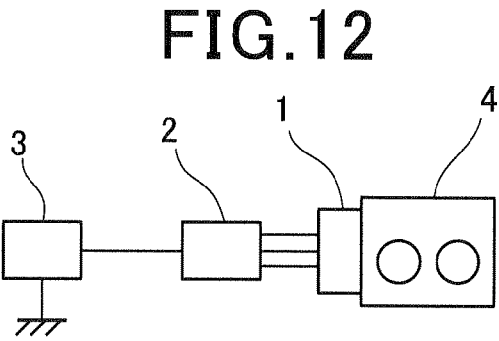
FIG. 12 is a diagram showing a configuration of a system to which the embodiments are applied.

Furthermore, as shown in FIG. 12, the motor-generator 1, to which the control of the above embodiment is applied, may be installed in an internal-combustion engine 4 of an automobile or a motorcycle. In this case, voltage-increasing electromotive drive may be applied when the internal-combustion engine 4 is activated. Hence, the rotating speed of the motor-generator 1 can be increased, while the time spent for starting the internal-combustion engine 4 can be significantly reduced. Therefore, driver anxiety can be eliminated when restarting the internal-combustion engine 4 after an idling stop.

Hereinafter, aspects of the above-described embodiments will be summarized.

As an aspect of the embodiment, a control apparatus for a motor-generator is provided, the apparatus including: a stator which includes multi-phase coils connected so as to form a star shape; a rotor which is coaxial with the stator and is arranged in the radial direction via a predetermined gap; a multi-phase inverter one arm of which includes a switch element and a free wheeling element; and a DC power supply which is connected between a neutral point of the multi-phase coils and a DC negative electrode of the multi-phase inverter. When the switch elements of the inverter are driven by rectangular wave pattern signal, the switch element of a low side connected to the switch element of a high side in series is subject to PWM switching control while the switch element of the high side is in an off-state. When a time point, at which the switch element of the high side is turned off, is defined as a base point, if $\alpha$ is defined as a time when switching of the switch element of the low side starts, and $\beta$ is defined as a time when the switching ends, $\beta$-$\alpha$ is 120 degrees in electrical degree or more, $\alpha$ is more than 0 degrees, and $\beta$ is less than 180 degrees.

As another aspect of the embodiment, a control apparatus for a motor-generator is provided, the apparatus including: a stator which includes multi-phase coils connected so as to form a star shape; a rotor which is coaxial with the stator and is arranged in the radial direction via a predetermined gap; a multi-phase inverter one arm of which includes a switch element and a free wheeling element; and a DC power supply which is connected between a neutral point of the multi-phase coils and a DC positive electrode of the multi-phase inverter. When the switch elements of the inverter are driven by rectangular wave pattern signal, the switch element of a high side connected to the switch element of a low side in series is subject to PWM switching control while the switch element of the low side is in an off-state. When a time point, at which the switch element of the low side is turned off, is defined as a base point, if $\alpha$ is defined as a time when switching of the switch element of the high side starts, and $\beta$ is defined as a time when the switching ends, $\beta$-$\alpha$ is 120 degrees in electrical degree or more, $\alpha$ is more than 0 degrees, and $\beta$ is less than 180 degrees.

According to the apparatus, the number of times of switching of the elements can be decreased. Thereby, decrease in efficiency due to switching losses, increase in temperature, and increase in noise current can be suppressed.

In addition, since advanced operation such as sinusoidal PWM control is not required, a low grade CPU can be used.

In the apparatus, a period of time of conduction of the switch element of the side, at which the switch element is not subject to PWM switching control, is 180 degrees in electrical degree or less. According to the apparatus, magnetic pole positions are not required to be detected precisely. Hence, a location detector can be simplified or excluded, which is further economical.

In the apparatus, an on-duty ratio of the PWM switching control is increased as rotating speed of the motor-generator is increased. According to the apparatus, even if the rotating speed is changed, an excellent voltage increasing function can be provided.

In the apparatus, the motor-generator is used in any one of an electric power generation mode as a generator and a mechanical power generation mode as a motor, and in the mechanical power generation mode, the PWM switching control is applied. According to the apparatus, unnecessary losses can be eliminated when electric power is generated. In addition, by setting the on-duty ratio as shown in FIG. 9, the shock can be reduced which is caused when the operation is changed from a mechanical power generation mode to an electric power generation mode.

In the apparatus, the motor-generator activates an internal-combustion engine in the mechanical power generation mode, and after the internal-combustion engine is activated, the motor-generator is driven in the electric power generation mode. According to the apparatus, the motor-generator can be used as both a starter of an internal-combustion engine and a generator, which is further economical.

In the apparatus, a capacitor is connected between a terminal of the DC power supply, which is not connected to DC terminals of the inverter, and one of the DC terminals of the inverter, which is not connected to the DC power supply. According to the apparatus, the variation width of voltage across the capacitor becomes smaller, which can decrease capacitance of the capacitor, and which is more economical.

In the apparatus, each arm of the inverter is configured with a MOSFET, the switch element is configured with a MOSFET, and the free wheeling element is configured with a diode parasitizing to the MOSFET of the switch element. According to the apparatus, mass-produced general-purpose devices can be used, which is even more economical, and which provides excellent mounting and control.

What is claimed is:

1. A control apparatus for a motor-generator, comprising:
   a stator which includes multi-phase coils connected so as to form a star shape;
   a rotor which is coaxial with the stator and is arranged in the radial direction via a predetermined gap;
   a multi-phase inverter, each arm of the multi-phase inverter including a switch element and a free wheeling element; and
   a DC power supply which is connected between a neutral point of the multi-phase coils and a DC negative electrode of the multi-phase inverter, wherein
   when the switch elements of the inverter are driven by rectangular wave pattern signal, the switch element of a low side connected to the switch element of a high side in series is subject to PWM switching control while the switch element of the high side is in an off-state,
   when a time point, at which the switch element of the high side is turned off, is defined as a base point, if $\alpha$ is defined as a time point at which switching of the switch element of the low side starts, and $\beta$ is defined as a time point at which the switching ends, $\beta$-$\alpha$ is 120 degrees in electrical degree or more, $\alpha$ is more than 0 degrees, and $\beta$ is less than 180 degrees,
   when the electrical degree is less than $\alpha$ and after the base point, the control is performed with a rectangular wave,
   when the electrical degree is between $\alpha$ and $\beta$, the control is performed with a PWM wave, and
   when the electrical degree is more than $\beta$ and before the switch element of the high side is turned on, the control is performed with the rectangular wave.

2. The control apparatus according to claim 1, wherein a period of time of conduction of the switch element of the side, at which the switch element is not subject to PWM switching control, is 180 degrees in electrical degree or less.

3. The control apparatus according to claim 1, wherein an on-duty ratio of the PWM switching control is increased as rotating speed of the motor-generator is increased.

4. The control apparatus according to claim 1, wherein
   the motor-generator is used in any one of an electric power generation mode as a generator and a mechanical power generation mode as a motor, and
   in the mechanical power generation mode, the PWM switching control is applied.

5. The control apparatus according to claim 4, wherein
the motor-generator activates an internal-combustion engine in the mechanical power generation mode, and
after the internal-combustion engine is activated, the motor-generator is driven in the electric power generation mode.

6. The control apparatus according to claim 1, wherein a capacitor is connected between a terminal of the DC power supply, which is not connected to DC terminals of the inverter, and one of the DC terminals of the inverter, which is not connected to the DC power supply.

7. The control apparatus according to claim 1, wherein
the switch element is configured by a MOSFET, and
the free wheeling element is configured by a diode parasitizing to the MOSFET.

8. The control apparatus according to claim 5, wherein
the motor-generator is a generator or a starter of a motor-cycle or an automobile.

9. A control apparatus for a motor-generator, comprising:
a stator which includes multi-phase coils connected so as to form a star shape;
a rotor which is coaxial with the stator and is arranged in the radial direction via a predetermined gap;
a multi-phase inverter, each arm of the multi-phase inverter including a switch element and a free wheeling element; and
a DC power supply which is connected between a neutral point of the multi-phase coils and a DC positive electrode of the multi-phase inverter, wherein
when the switch elements of the inverter are driven by rectangular wave pattern signal, the switch element of a high side connected to the switch element of a low side in series is subject to PWM switching control while the switch element of the low side is in an off-state,
when a time point, at which the switch element of the low side is turned off, is defined as a base point, if $\alpha$ is defined as a time point at which switching of the switch element of the high side starts, and $\beta$ is defined as a time point at which the switching ends, $\beta$-$\alpha$ is 120 degrees in electrical degree or more, $\alpha$ is more than 0 degrees, and $\beta$ is less than 180 degrees,
when the electrical degree is less than $\alpha$ and after the base point, the control is performed with a rectangular wave,
when the electrical degree is between $\alpha$ and $\beta$, the control is performed with a PWM wave, and
when the electrical degree is more than $\beta$ and before the switch element of the high side is turned on, the control is performed with the rectangular wave.

10. The control apparatus according to claim 9, wherein a period of time of conduction of the switch element of the side, at which the switch element is not subject to PWM switching control, is 180 degrees in electrical degree or less.

11. The control apparatus according to claim 9, wherein an on-duty ratio of the PWM switching control is increased as rotating speed of the motor-generator is increased.

12. The control apparatus according to claim 9, wherein
the motor-generator is used in any one of an electric power generation mode as a generator and a mechanical power generation mode as a motor, and
in the mechanical power generation mode, the PWM switching control is applied.

13. The control apparatus according to claim 12, wherein
the motor-generator activates an internal-combustion engine in the mechanical power generation mode, and
after the internal-combustion engine is activated, the motor-generator is driven in the electric power generation mode.

14. The control apparatus according to claim 9, wherein a capacitor is connected between a terminal of the DC power supply, which is not connected to DC terminals of the inverter, and one of the DC terminals of the inverter, which is not connected to the DC power supply.

15. The control apparatus according to claim 9, wherein
the switch element is configured by a MOSFET, and
the free wheeling element is configured by a diode parasitizing to the.

16. The control apparatus according to claim 13, wherein
the motor-generator is a generator or a starter of a motor-cycle or an automobile.

* * * * *

UNITED STATES PATENT AND TRADEMARK OFFICE
CERTIFICATE OF CORRECTION

PATENT NO. : 9,166,504 B2
APPLICATION NO. : 13/644739
DATED : October 20, 2015
INVENTOR(S) : Taniguchi et al.

Page 1 of 1

It is certified that error appears in the above-identified patent and that said Letters Patent is hereby corrected as shown below:

IN THE CLAIMS
Column 8, lines 35 and 36, patent Claim 15, lines 3 and 4, "the free wheeling element is configured by a diode parasitizing to the." should be --the free wheeling element is configured by a diode parasitizing to the MOSFET.--

Signed and Sealed this
Twenty-second Day of March, 2016

Michelle K. Lee
*Director of the United States Patent and Trademark Office*